Patented Aug. 25, 1925.

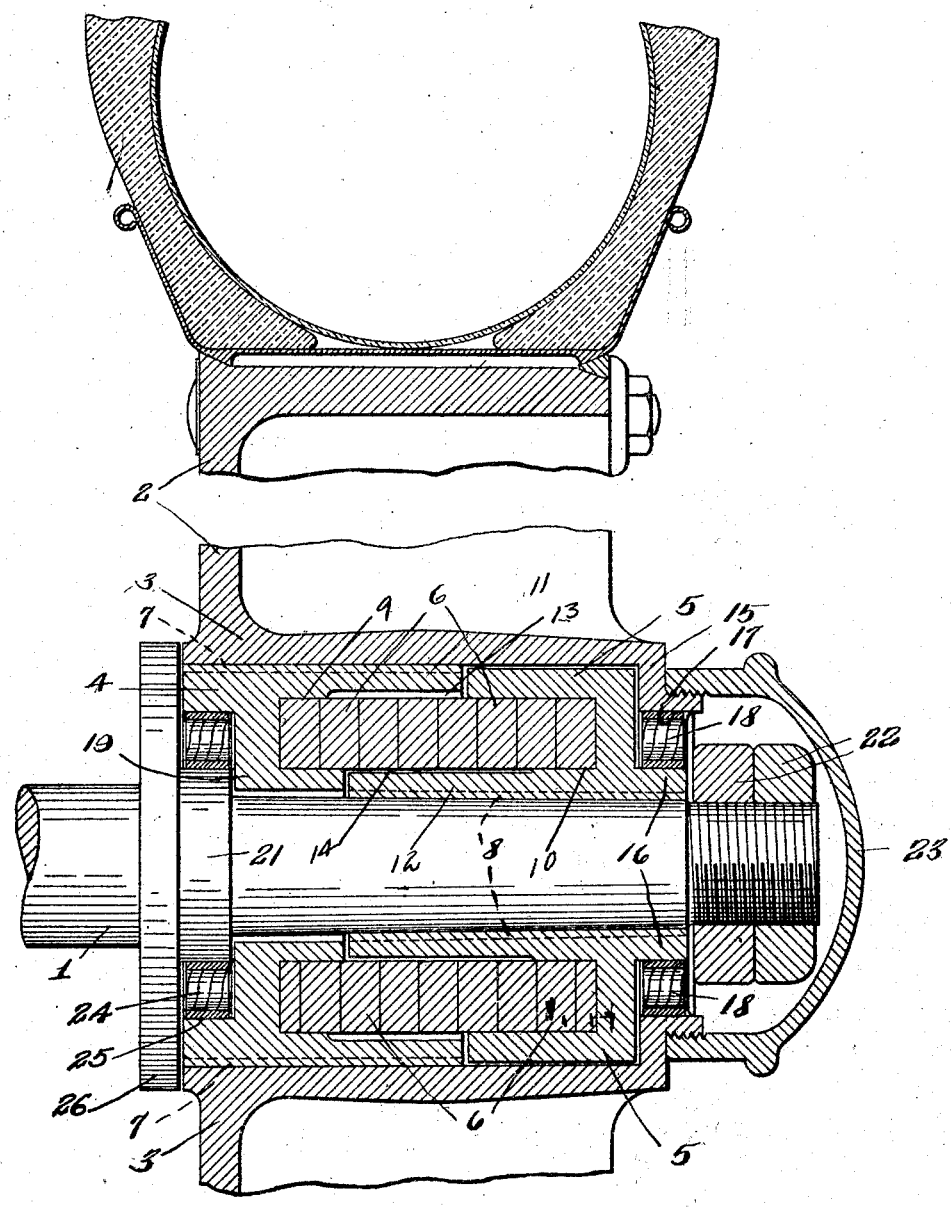

1,550,817

UNITED STATES PATENT OFFICE.

MAXWELL R. KARGE, OF PHOENIX, NEW YORK.

FLEXIBLE POWER-TRANSMITTING ELEMENT BETWEEN SHAFT AND WHEEL MOUNTED THEREON.

Application filed July 9, 1920. Serial No. 395,001.

*To all whom it may concern:*

Be it known that I, MAXWELL R. KARGE, a citizen of the United States, and a resident of Phoenix, in the county of Oswego and State of New York, have invented a certain new and useful Flexible Power-Transmitting Element Between Shaft and Wheel Mounted Thereon, of which the following is a specification.

This invention has for its object the production of a particularly simple, efficient and durable flexible power transmitting means and the arrangement thereof between driving and driven elements whereby one element is mounted on the other, such as a wheel on a shaft, or a wheel on a driving axle. The invention consists in the novel features and in the combinations and constructions hereinafter set forth and claimed.

In describing this invention, reference is had to the accompanying drawing which is a fragmentary sectional view of one embodiment of my invention, it being shown as incorporated in the drive wheel and axle of a motor vehicle.

This invention comprises generally, driving and driven elements, one being mounted on the other, and yielding power transmitting means between said elements comprising a coiled torsion spring encircling the inner element within the outer element and connected at its ends to said elements respectively.

I have shown my invention as embodied in the driving wheel and axle of a motor vehicle, although it may be embodied in any mechanism, embodying driving and driven elements where one is mounted on the other.

1 designates a shaft or axle; 2, a wheel having a hub 3 mounted concentric with the axle.

The power transmitting means between the shaft 1 and the hub 3 of the wheel 2 comprises heads or collars 4, 5 mounted on the shaft within the wheel hub 3, and a coiled torsion spring 6 concentric with the shaft and connected at its ends to the heads, one head as 4 being fixed to the hub 3 to rotate therewith and the other head 5 to the shaft to rotate therewith. The heads are here shown as keyed at 7 and 8 respectively to the wheel hub 3 and the shaft 1, and one head as the inner head 3 is slidable axially during tensioning of the spring. The heads are formed with an annular socket 9 or 10 in their opposing faces in which the end coils of the spring are secured in any suitable manner, as by shrinking the heads thereon; and the heads 4 and 5 formed respectively with sleeve extensions 11, 12 extending respectively from the outer wall of the socket 9 of the head 4 and the inner wall or hub of the socket 10 of the head 5, the sleeve 11 fitting the bore of the wheel hub 3 and the sleeve 12 fitting the shaft. The sleeve 11 or 12 of each head terminates near the opposing end of the other head, and said sleeve encloses the intermediate coils of the spring 6. They are provided with clearances 13, 14 for permitting a limited expansion and contraction of the spring during tensioning thereof, in one direction or the other. The intermediate coils bind on the outer sleeve 11 if the spring expands or on the inner sleeve 12 if it contracts so that the spring acts as a solid member. Also the coils of the spring are preferably provided with flat opposing faces which act as friction plates on each other when the spring is contracted a predetermined amount, and prevent undue tensioning and strain on the spring. The spring is arranged to contract during driving of the wheel in a forward direction. Hence the spring employed at the opposite ends of an axle are preferably coiled in opposite directions. Said spring is preferably formed as set forth in my pending application, Sr. No. 364,712, filed March 10, 1920, and the heads and assembly of the heads and spring as in my pending application, Sr. No. 273,548 filed Jan. 28, 1919.

The hub 3 of the wheel has a bearing on the head 5 which is keyed to the shaft 1; and the head 4 which is keyed to the wheel hub has a bearing on the shaft. As shown, the wheel hub 3 is formed with an internal annular flange 15 at one end, as the outer end, of its bore, the head 5 thrusts against said flange, and is provided with an external hub 16 opposed to the inner cylindrical face 17 of said flange, and antifriction bearings 18 are interposed between hub 16 and face 17; and the head 4 is formed with an annular flange 19 at its outer end opposed to the shaft or an enlargement 21 thereon and antifriction bearings 24 are interposed between the inner cylindrical face 25 and the periphery of the enlargement 21. The outer end of the flange 19 thrusts against the enlargement 21 on the shaft 1 and also the end face of the head 4 abuts against the collar 26.

Suitable nuts 22 thread on the outer end of the shaft against the end of the hub 16. Also a suitable hub cap 23 encloses the outer end of the wheel hub. In operation shocks, due to sudden starting of the shaft or axle 1 or to retardation of the wheel either due to the wheel striking obstructions in the road or to the application of the brakes, are absorbed by the spring and hence the gears, engine and bearings of the motor vehicle relieved of shock they would otherwise be subject to.

Although I have shown my invention as embodied in a driving axle and wheel obviously it may be used between any driving and driven elements in which one is mounted on the other.

What I claim is:

1. The combination of driving and driven elements, one being mounted on the other and yielding power transmitting means between said elements comprising a coiled spring encircling the inner element within the outer element, said spring being connected at its ends respectively to said elements whereby the torque of the driving element is transmitted to the driven element through the spring, the convolutions of the spring having opposing flat faces arranged to bind as friction plates when the spring is tensioned a predetermined amount, substantially as and for the purpose described.

2. The combination of driving and driven elements, one being mounted on the other and yielding power transmitting means between said elements comprising a coiled spring encircling the inner element within the outer element, said spring being connected at its ends respectively to said elements whereby the torque of the driving element is transmitted to the driven element through the spring, the convolutions of the spring having opposing flat faces arranged to bind as friction plates when the spring is tensioned a predetermined amount, and means for coacting with the springs on which the spring binds to limit the tensioning thereof, substantially as and for the purpose specified.

3. The combination of driving and driven elements, one being mounted on the other, and yielding power transmitting means between said elements comprising opposing heads mounted on the inner element within the outer, one head being fixed to the inner element to rotate therewith and the other being fixed to the outer element to turn therewith, and a coiled torsion spring arranged concentric with said elements and fixed at its ends to said heads respectively and means for limiting the torquing movement of the spring, substantially as and for the purpose set forth.

4. The combination of driving and driven elements, one being mounted on the other, and yielding power transmitting means between said elements comprising opposing heads mounted on the inner element within the outer, one head having a sleeve extension encircling the inner element and keyed thereto and terminating near the other head and such other head having a sleeve extension adjacent the bore of the outer element and keyed thereto and terminating short of the former head, the sleeve extension enclosing an annular chamber, and a coiled spring located in said chamber and fixed at its ends to said heads, substantially as and for the purpose described.

5. The combination of driving and driven elements, one being mounted on the other, and yielding power transmitting means between said elements comprising opposing heads mounted in the inner element within the outer, one head having a sleeve extension extending toward and terminating near the other head, and a coiled torsion spring arranged concentric with said element and said sleeve to bind thereon when tensioned, the spring being fixed at its ends to said heads, substantially as and for the purpose specified.

6. The combination of driving and driven elements, one being mounted on the other, and yielding power transmitting means between said elements comprising opposing heads mounted in the inner element within the outer, one head having a sleeve extension extending toward and terminating near the other head, and a coiled torsion spring arranged concentric with said element and said sleeve to bind thereon when tensioned, the spring being fixed at its ends to said heads, the portion of the sleeve extension contiguous to the intermediate coils being normally spaced apart from said coils to provide clearance for changes in diameter of the intermediate coils as the spring is tensioned, substantially as and for the purpose set forth.

7. The combination of a shaft, a wheel having a hub having an internal annular flange at one end of the bore, and a flexible power transmitting means between the shaft and the hub comprising opposing heads mounted on the shaft and a coiled torsion spring connected at its ends to said heads, one of said heads being keyed to the shaft and abutting against the internal annular flange, and having an external hub located within and spaced from the inner cylindrical face of said flange, bearings between the last mentioned hub and said cylindrical flange, the other head being keyed to the hub of the wheel and having an annular flange at its outer end opposed to and spaced apart from the shaft, and bearings between the last mentioned flange and the shaft, substantially as and for the purpose described.

8. The combination of a shaft, a wheel having a hub having an internal annular flange at one end of the bore, and a flexible power transmitting means between the shaft and the hub comprising opposing heads mounted on the shaft and a coiled torsion spring connected at its ends to said heads, one of said heads being keyed to the shaft and abutting against the internal annular flange, and having an external hub located within and spaced from the inner cylindrical face of said flange, bearings between the last mentioned hub and said cylindrical flange, the other head being keyed to the hub of the wheel and having an annular flange at its outer end opposed to and spaced apart from the shaft, and bearings between the last mentioned flange and the shaft, and shoulders on the shaft opposed to the outer ends of the heads, substantially as and for the purpose specified.

9. The combination of driving and driven elements comprising opposing headers having annular recesses in their opposing faces, a coiled spring connecting the headers and having its end coils secured in said recesses and snugly fitting the inner and outer annular walls of the recesses, the intermediate coils of the spring having opposing flat faces arranged to bind as torsion plates when the spring is tensioned a predetermined amount, substantially as and for the purpose specified.

In testimony whereof, I have hereunto signed my name, at Phoenix, the county of Oswego, and State of New York, this 26th day of June, 1920.

MAXWELL R. KARGE.